(12) United States Patent
Gilmore et al.

(10) Patent No.: US 11,076,531 B2
(45) Date of Patent: Aug. 3, 2021

(54) STATE MACHINE FOR MULTIPLE INPUT-MULTIPLE OUTPUT HARVESTER CONTROL

(71) Applicant: Deere & Company, Moline, IL (US)

(72) Inventors: Brian J. Gilmore, Davenport, IA (US); Paul Readel, Bettendorf, IA (US); Bhanu Kiran Reddy Palla, Bettendorf, IA (US); Timothy S. Hunt, Davenport, IA (US); Douglas J. Bollin, Port Byron, IL (US); John M. Hageman, Dubuque, IA (US); Aaron J. Bruns, Bettendorf, IA (US)

(73) Assignee: Deere & Company, Moline, IL (US)

(*) Notice: Subject to any disclaimer, the term of this patent is extended or adjusted under 35 U.S.C. 154(b) by 184 days.

(21) Appl. No.: 15/877,655

(22) Filed: Jan. 23, 2018

(65) Prior Publication Data
US 2019/0223379 A1     Jul. 25, 2019

(51) Int. Cl.
| | |
|---|---|
| *G06F 7/00* | (2006.01) |
| *A01D 41/127* | (2006.01) |
| *B60W 10/30* | (2006.01) |
| *G05B 19/045* | (2006.01) |
| *G06F 9/448* | (2018.01) |
| *G05B 13/02* | (2006.01) |

(52) U.S. Cl.
CPC .......... *A01D 41/127* (2013.01); *B60W 10/30* (2013.01); *G05B 19/045* (2013.01); *B60W 2300/158* (2013.01); *B60W 2510/30* (2013.01); *B60W 2555/00* (2020.02); *B60W 2710/30* (2013.01); *G05B 13/021* (2013.01); *G05B 2219/23289* (2013.01); *G06F 9/4498* (2018.02)

(58) Field of Classification Search
CPC .... A01D 41/127; B60W 10/30; G05B 19/045
USPC .......................................................... 701/36
See application file for complete search history.

(56) References Cited

U.S. PATENT DOCUMENTS

| | | |
|---|---|---|
| 5,535,577 A | 7/1996 | Chmielewski, Jr. |
| 6,336,051 B1 | 1/2002 | Pangels et al. |
| | (Continued) | |

FOREIGN PATENT DOCUMENTS

| | | |
|---|---|---|
| EP | 1446997 A1 | 8/2004 |
| EP | 2220926 A1 | 8/2010 |
| EP | 2687923 A2 | 1/2014 |

OTHER PUBLICATIONS

EP Patent Application No. 19153018.7 Extended European Search Report dated Jul. 16, 2019.

(Continued)

*Primary Examiner* — Mahmoud S Ismail
(74) *Attorney, Agent, or Firm* — Joseph R. Kelly; Kelly, Holt & Christenson PLLC

(57) ABSTRACT

An overall machine operational state (such as a problem state, field state, machine state, other non-problem state, etc.) is identified, and exit and entry conditions are monitored to determine whether the machine transitions into another operational state. When the machine transitions into a problem state, a multiple input, multiple output control system uses a state machine to identify the problem state and a solution is identified. The solution is indicative of machine settings that will return the machine to an acceptable, operational state. Control signals are generated to modify the machine settings based on the identified solution.

13 Claims, 9 Drawing Sheets

(56) References Cited

U.S. PATENT DOCUMENTS

| | | | |
|---|---|---|---|
| 6,490,539 B1* | 12/2002 | Dickson | A01B 69/008 |
| | | | 180/168 |
| 6,668,203 B1 | 12/2003 | Cook et al. | |
| 8,989,972 B2 | 3/2015 | Anderson | |
| 9,402,344 B1* | 8/2016 | Wenzel | A01D 41/127 |
| 9,527,211 B2 | 12/2016 | Posselius et al. | |
| 9,835,347 B2 | 12/2017 | Asmus et al. | |
| 2012/0004512 A1 | 1/2012 | Kovatchev et al. | |
| 2012/0004812 A1 | 1/2012 | Baumgarten et al. | |
| 2014/0019017 A1 | 1/2014 | Wilken et al. | |
| 2014/0277960 A1 | 9/2014 | Blank | |
| 2015/0199360 A1* | 7/2015 | Pfeiffer | G06F 16/24578 |
| | | | 707/723 |
| 2016/0161139 A1 | 6/2016 | Asmus et al. | |

OTHER PUBLICATIONS

"Development of soft computing and applications in agricultural and biological engineering", Y. Yuang et. al., Computers and Electronic in Agriculture, 71(2010) 107-127.

'Research on Application of Fuzzy Neural Network in Combine harvester, Y, Zhou et. al. Proceedings of Fifth International Conference on Fuzzy Systems and Knowledge Discovery. 2008 pp231-235.

* cited by examiner ial equipment. More specifically, the present description
STATE MACHINE FOR MULTIPLE INPUT-MULTIPLE OUTPUT HARVESTER CONTROL

FIELD OF THE DESCRIPTION

The present description relates to the control of agricultural equipment. More specifically, the present description relates to control of agricultural harvesters.

BACKGROUND

There are a wide variety of different types of agricultural machines. Some such machines include harvesting machines, such as combine harvesters (or combines). Combine harvesters can be relatively complicated to operate. There are a variety of different types of machine settings that can be made (manually or automatically) that change the way the machine operates. For instance, some machine settings include sieve and chaffer settings, fan speed settings, rotor settings, among a wide variety of others.

It can be difficult for an operator to know how to modify various settings, when the operator observes undesirable performance. For instance, it may be that the operator observes a relatively high crop loss. The operator may thus make a change to one machine setting, which may address crop loss, but which also may deleteriously affect other operating parameters, such as grain quality, yield, etc.

There have been some attempts to implement some forms of automated machine control. However, these systems often use a single input-single output system. For instance, a single signal may be monitored, and if its value deviates from a given range, then a machine setting may be automatically modified to bring that signal back within its desired range. However, as with manual setting changes, this may cause another signal to deviate from its desired range, resulting in another settings change. This often results in the automated system iterating among a variety of different sub-optimal machine settings in an attempt to satisfy all of the single input-single output control loops.

The discussion above is merely provided for general background information and is not intended to be used as an aid in determining the scope of the claimed subject matter.

SUMMARY

An overall machine operational state (such as a problem state, field state, machine state, other non-problem state, etc.) is identified, and exit and entry conditions are monitored to determine whether the machine transitions into another operational state. When the machine transitions into a problem state, a multiple input, multiple output control system uses a state machine to identify the problem state and a solution is identified. The solution is indicative of machine settings that will return the machine to an acceptable, operational state. Control signals are generated to modify the machine settings based on the identified solution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
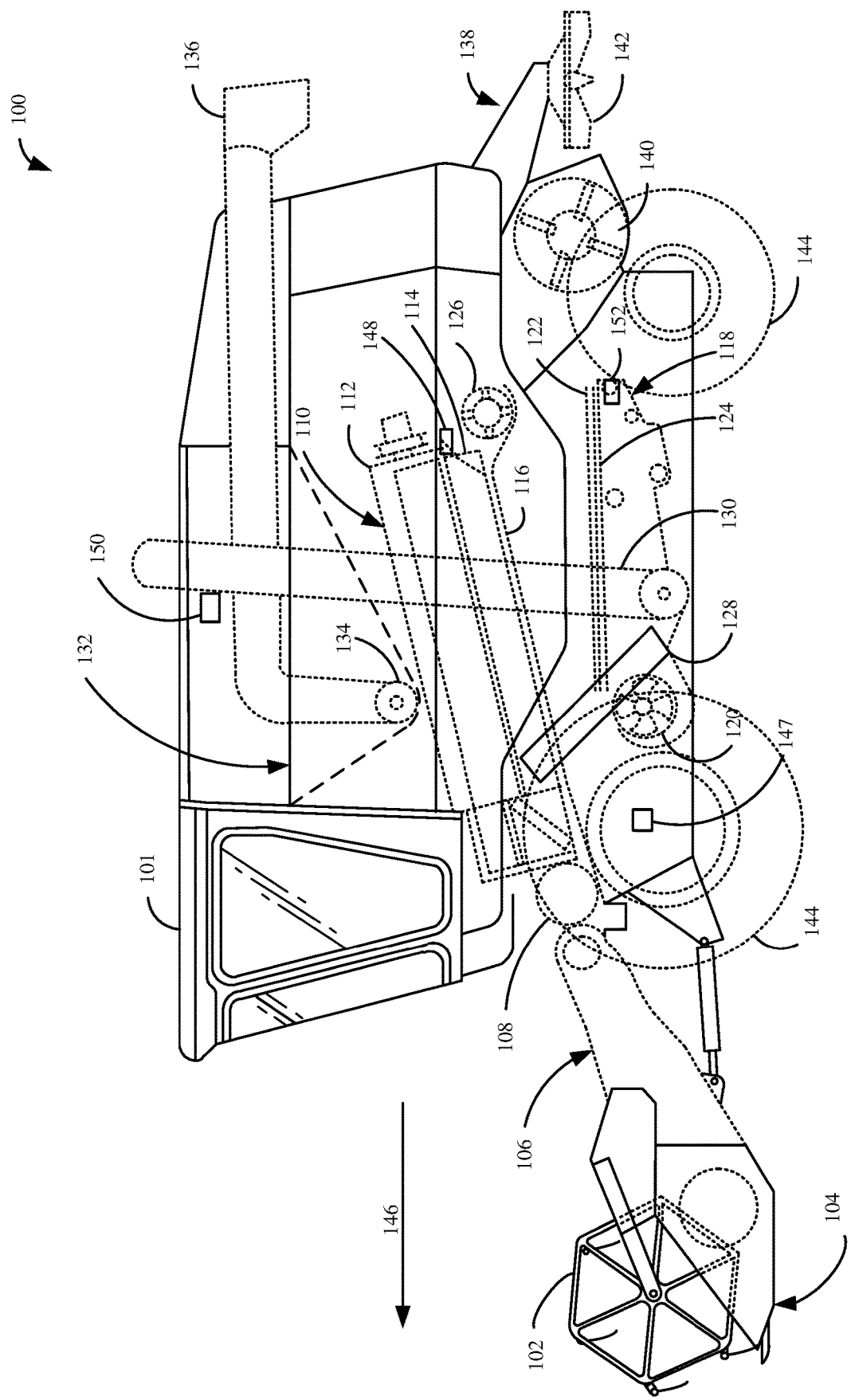
FIG. 1 is a partial pictorial, partial block diagram of an agricultural harvesting machine (e.g., a combine harvester).

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They can include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
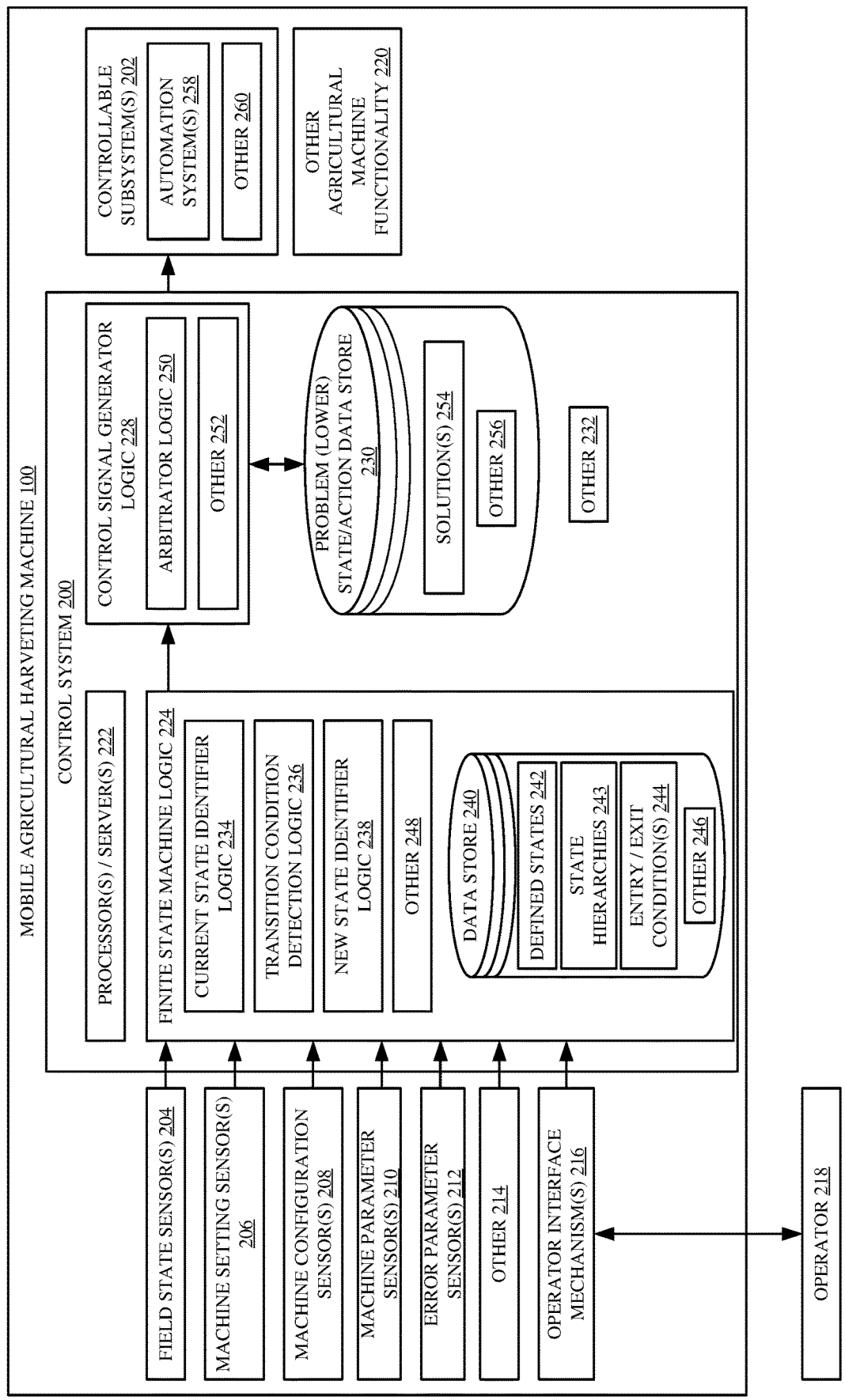
FIG. 2 is a block diagram showing one example of some items of the combine harvester illustrated in FIG. 1, in more detail.

FIG. 2 is a block diagram showing one example of some of the items of mobile agricultural harvesting machine (combine) 100 in more detail. In the example shown in FIG. 2, it can be seen that machine 100 includes control system 200 that receives sensor inputs from a set of sensors and that generates control signals to control one or more controllable subsystems 202. The sensor inputs can be from any of the sensors mentioned above, or others. For instance, the sensors can include field state sensors 204, machine setting sensors 206, machine configuration sensors 208, machine parameter sensors 210, error parameter sensors 212, and/or a wide variety of other sensors 214. Control system 200 can also receive operator inputs and generate operator outputs through operator interface mechanisms 216. Operator 218 can illustratively interact with machine 100 through operator interface mechanisms 216 as well. FIG. 2 shows that harvesting machine 100 also illustratively includes a wide variety of other agricultural machine functionality 220.

The operation interface mechanisms can include visual, audio or haptic mechanisms. They can include one or more display screens with user input mechanisms, which may be on a touch sensitive screen. They can include levers, pedals, joysticks, buttons, switches, a steering wheel or other things. They can include a microphone and a speech recognition/synthesis system. They can include a wide variety of other things as well.

Before describing the overall operation of harvesting machine 100 in more detail, a brief description of some of the items in harvesting machine 100, and their operation, will first be provided. Also, before describing the sensors, it should be noted that many of the sensor inputs can be augmented, or replaced by, operator inputs. For instance, instead of sensing a variable, the value of the variable may be input by the operator. Thus, the sensors described below may be augmented with, or replaced by, operator inputs.

Field state sensors 204 can include a wide variety of different types of sensors that sense different characteristics or attributes of a field over which harvesting machine 100 is traveling. For instance, sensors 204 can include a crop type sensor (as well as a crop variety sensor), a soil or crop moisture sensor, a yield sensor, a terrain or topology sensor which senses the terrain (such as the terrain or topology of the field), a weather/climate sensor, or a wide variety of other sensors. Sensors 204 illustratively sense variables that are indicative of these sensed variables or field characteristics, or sense a value that can be used to derive these values.

Machine settings sensors 206 illustratively generate signals indicative of current machine settings. The machine setting sensors can sense any of a wide variety of different types of machine settings. For instance, they can sense fan speed settings, chaffer and sieve settings, rotor settings, among a wide variety of other types of settings.

Machine configuration sensors 208 can sense a variety of different types of machine configurations. For instance, they can sense whether the machine 100 is configured to spread the tailings or simply drop them in a windrow. They can sense the different types of automation packages that are available on the machine. They can also sense a wide variety of other machine configurations.

Machine parameters sensors 210 sense machine parameters that are currently present. Such things can include machine ground speed, machine position (based on a GPS receiver signal, for example), rotor pressure or other things.

Error parameter sensors 212 illustratively sense operating parameters that may be indicative of error conditions on the machine. For instance, they can include sensors that sense material other than grain (MOG) that is entering the clean grain tank 132. There can be multiple different sensors for sensing multiple different types of MOG, such as light MOG, heavy MOG, etc. Sensors 212 can include a variety of other sensors, such as a sensor for sensing how much broken grain is entering the clean grain tank 132. This, for instance, can be camera 150 along with a set of image processing logic. Sensors 212 can also include crop loss sensors, such as the loss sensors 148 and 152 described above with respect to FIG. 1. They can include a wide variety of other sensors, such as crop quality sensors, or other sensors that may be used to indicate whether machine 100 is operating in a problem state where machine settings or other control signals need to be generated to address the problem state.

The sensor signals generated by sensors 204-214 can also be provided to signal conditioning logic (not separately shown) which may perform conditioning functions, such as amplification, linearization, filtering, compensation, and/or other conditioning functions. Control system 200, in one example, includes processors or servers 222, finite state machine logic 224, control signal generator logic 228, problem state/action data store 230, and it can include a wide variety of other items 232. Finite state machine logic 224 illustratively includes current state identifier logic 234, transition condition detection logic 236, new state identifier logic 238, memory or data store 240 (which illustratively stores or represents the defined states 242 that machine 100 can be in, entry/exit conditions 244 that define when machine 100 is entering a new state or exiting a previous state (such as what combinations of sensor signals indicate that the machine is transitioning between specific states), and it can include a wide variety of items 246. Finite state machine logic 224 can include other items 248 as well.

The predefined states 242 can be broken into problem states and non-problem states. These are described in more detail below. States 242 may also be arranged according to one or more state hierarchies which indicate whether an operational state is closer to, or further from, optimum operation based on any of a variety of different criteria. The criteria for a state hierarchy may be based on operator preference (e.g., the operator provides an input ranking fuel economy over grain quality), they may be predefined, or changed dynamically or set out in other ways.

Control signal generator logic 228 illustratively includes arbitrator logic 250 and it can include other items 252. These are described in greater detail below.

The data store 230 illustratively includes a mapping or other indication of problem states (or lower states) and corresponding solutions 254. It can include other items 256. By way of example, when finite state machine logic 224 generates an output indicating that machine 100 is in a problem state, then control signal generator logic 228 can access problem state/action data store 230 to identify a solution 254, which indicates what types of control signals are to be generated, in response to machine 100 being in the specified problem state (or lower state on a hierarchy). For instance, if the problem state is that crop loss is too high, with a certain type of crop, traveling at a certain speed, with a certain machine configuration, etc., then the solution may be to generate a plurality of control signals that modify a plurality of different machine settings (such as to reduce ground speed, adjust fan speed, etc.), to address the problem state that the machine is in. This is just one example.

It should also be noted that multiple solutions may correspond to one problem state (or to one lower state). When this is the case, a solution hierarchy (or other mechanism) may indicate which solution to try first, and the order in which the solutions should be attempted.

Controllable subsystems 202 illustratively include automation system 258, and they can include a wide variety of other systems 260, such as any of the systems that control machine settings, machine operating parameters, etc. Automation systems 258 can include a wide variety of different types of automation systems that automatically control a portion of machine 100. For instance, they can include traction control systems, operator assistive systems for assisting the operator in controlling the harvesting machine 100, or a wide variety of other systems. Some of the systems can be selectable by the operator so that if they are selected, they are activated and operating, but if they are not selected, they are inactive. In addition, in one example, the automation systems 258 can be selected by the machine control system 200, itself.

Further, in one example, either the operator provides a hierarchy input, or the machine control system 200 generates or retrieves a hierarchy input which indicates a precedence hierarchy for the different automation systems 258 that are activated on machine 100. In this way, when control signal generator logic 228 is generating control signals to address a problem state, it can generate control signals to preferentially control the automated systems 258, according to that precedence hierarchy. Thus, it can generate control signals to control the automated system that is ranked highest in the precedence hierarchy first, in order to attempt to address the problem state. If that does not work, it can then generate control signals to control the automated system that ranks second highest in the precedence hierarchy. In one example, arbitrator logic 250, in control signal generator 228, arbitrates among controlling the various automation systems 258, based upon a precedence hierarchy.

Figure 3A:
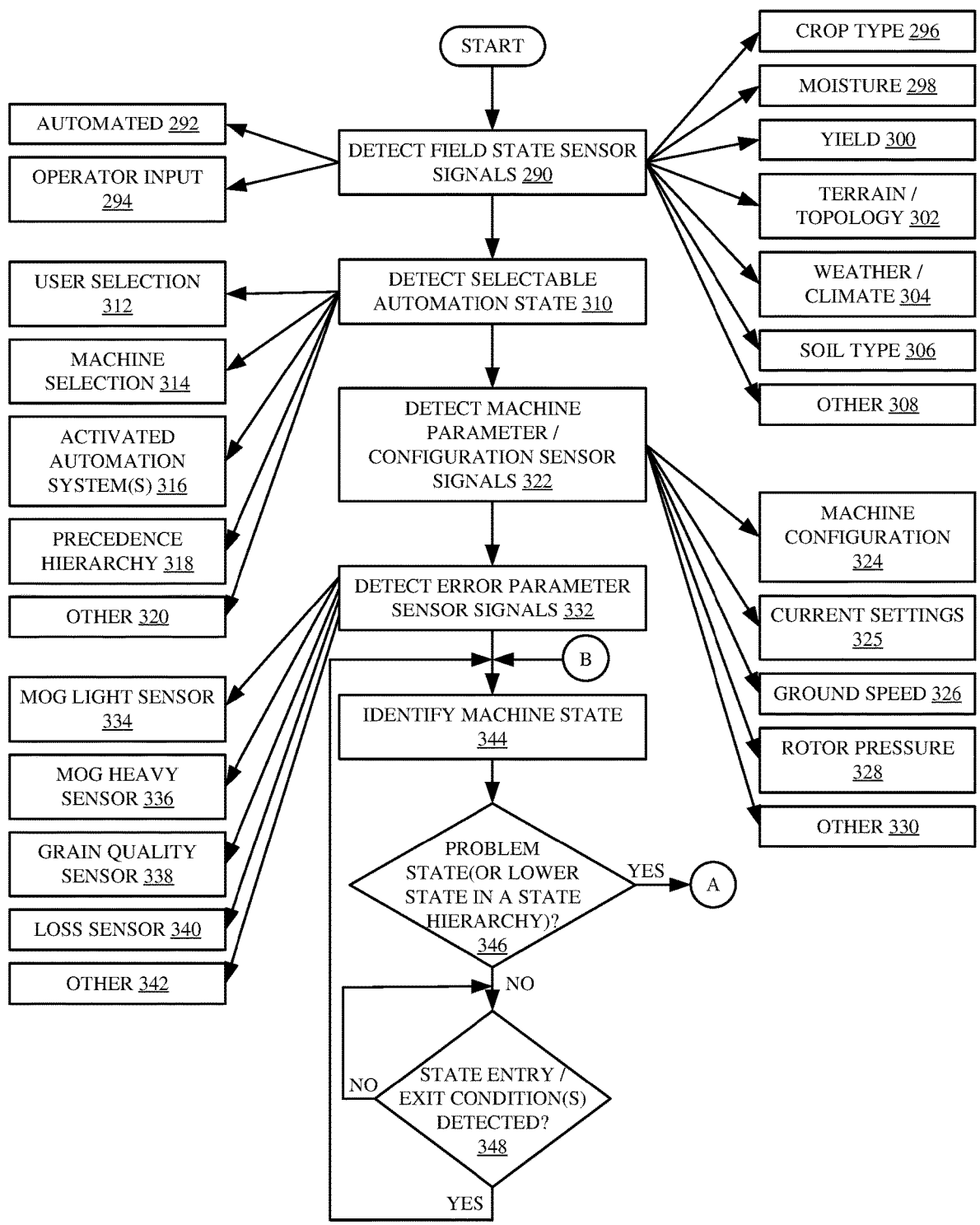
FIGS. 3A and 3B (collectively referred to herein as FIG. 3) show a flow diagram illustrating one example of the operation of the combine harvester illustrated in FIGS. 1 and 2 in performing automated control using a multiple input-multiple output state machine architecture.
Figure 3B:
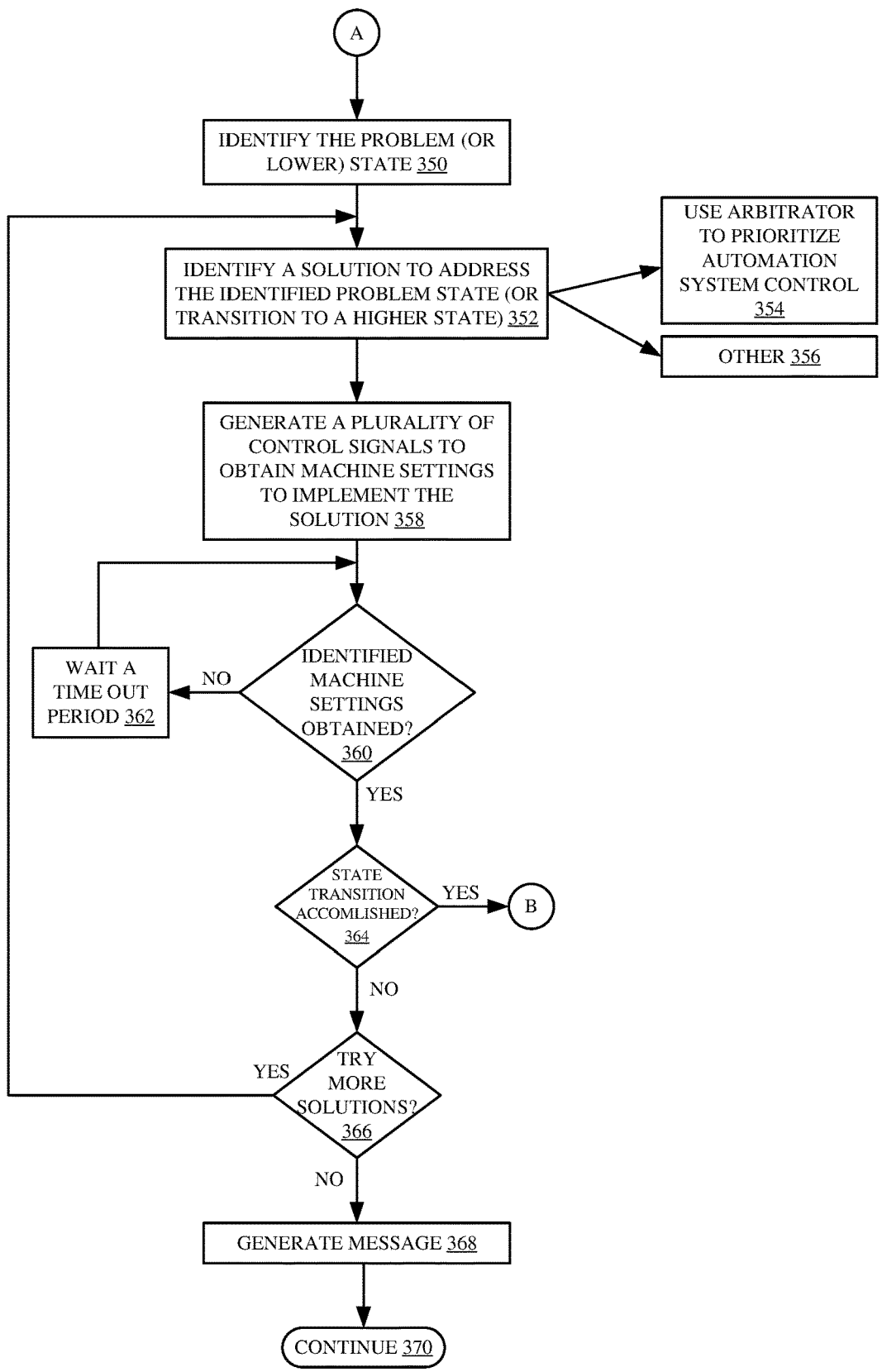

FIGS. 3A and 3B (collectively referred to herein as FIG. 3) show a flow chart illustrating one example of the operation of control system 200 in controlling harvesting machine 100, using the multiple input-multiple output architecture shown in FIG. 2. The control is performed by using finite state machine logic 224 to identify an operational state for machine 100 based upon the sensor signals received, the different predefined machine states 242, and the entry and exit conditions 244. Control signals are generated to control controllable subsystems 202 to address any problem states.

It is first assumed that machine 100 is operating in a field, and that finite state machine logic 224 includes defined states 242, that define the various operating states of machine 100. The states may include normal operating states, where no correction or adjustment needs to be made. They may also include problem or trouble states where a set of control signals is to be generated in order to modify machine settings, or make other control adjustments, in order to address the problem state and transition to a normal operating state. They may also be defined according to one or more state hierarchies 243 where attempts can be made to transition from a lower state to a higher state in an applicable hierarchy.

In one example, the states are defined based on multiple input signals, which can be sensor input signals, and/or operator input signals, among other things. State transitions (where the machine exits one state and enters another state), are also illustratively defined as entry/exit conditions 244. Therefore, logic 224 is configured to identify a current operational state that machine 100 is operating in, and then to identify state exit conditions and/or entry conditions that indicate when the machine 100 is exiting that state and entering another state. It is also assumed that control system 200 has control signal generator logic 228 that can determine when multiple output control signals need to be modified in order to attempt to transition machine 100 to another operational state (e.g., to move higher on a state hierarchy or to address a problem state). This can be done using a dynamic model that models the operation of machine 100 so that when it is in a problem state (or a lower state on a hierarchy), the model provides an output solution which is indicative of the output control signals that need to be generated in order to address the problem state (or transition machine 100 to another state in the hierarchy). It can also be done by using mappings or other mechanisms that map from a current state (e.g., a current problem or low state) to a solution which is, itself, indicative of control signals that need to be generated in order to address the problem state (or lower state) and transition to a normal operating state (or higher operating state).

Current state identifier logic 234 then detects field state sensor signals from field state sensors 204. This is indicated by block 290 in FIG. 3. As mentioned above, the sensor signals can be automatically generated sensor signals as indicated by block 292, or they can be representative of operator inputs, as indicated by block 294. The field state sensors signals can identify a crop type 296, moisture conditions (crop moisture, soil moisture, etc.) 298, yield 300, terrain/topography 302, weather/climate information 304, soil type 306, or a wide variety of other field characteristics 308. Some of the information can also be generated in other ways, other than an operator input or an active sensor. For instance, the topology or terrain characteristics of the field over which machine 100 is traveling can be generated by an active sensor, such as an accelerometer which outputs an indication of the orientation of a machine 100, and thus an indication of the slope of the field. However, it can also (or in addition) be determined based upon a predefined map of the field over which machine 100 is traveling, that indicates the topography of the field based on geographic position. The map can be downloaded to machine 100, or otherwise accessed by control system 200.

Current state identifier logic 234 also detects a selectable automation state. This is indicated by block 310. The selectable automation state can indicate which automation systems 258 are active (based on an operator selection 312, or by machine selection 314). Having the selectable automation state be indicative of activated automation logic (or automation systems) 258 is indicated by block 316.

In one example, the automation state also indicates a precedence hierarchy among the plurality of different activated automation systems 258. For instance, where the automation systems include a control automation system, a traction control system, and/or other automation systems, the user may input a precedence hierarchy indicating which of those systems are to be controlled first, when a transition to another operational state (e.g., to address a problem state) is to be attempted. If the state transition cannot be accomplished based on controlling the highest automation system in the precedence hierarchy, then the next automation system may be controlled in order to address the problem state (or to attempt another state transition, etc.). Having the selectable automation state indicate a precedence hierarchy is indicated by block 318. The selectable automation state can indicate a wide variety of other things as well, and this is indicated by block 320.

Current state identifier logic 234 then detects machine parameter sensor signals from machine parameter sensors 210. It can also detect machine configuration sensor signals from machine configuration sensors 208. This is indicated by block 322 in the flow diagram of FIG. 3. The machine configuration signals are illustratively indicative of the machine configuration, as discussed above. This is indicated by block 324. The machine operation parameter sensor signals may be indicative of current machine settings 324 (e.g., fan speed, sieve/chaffer openings, concave settings, rotor speed, etc.), ground speed 326, rotor pressure 328, and/or a wide variety of other things, such as geographic position, or many other things. This is indicated by block 330. Current state identifier logic 234 also illustratively detects error parameter sensor signals from error parameters sensors 212. This is indicated by block 332 in the flow diagram of FIG. 3. The error parameter sensors may include such things as a MOG light sensor 334, a MOG heavy sensor 336, grain quality sensor 338, grain loss sensor 340, or a wide variety of other sensors that generate signals that may be monitored to determine whether machine 100 is entering, or has entered, a problem state or a lower state, where control signals are to be generated in order to modify the control of machine 100 in order to address the problem state or make a state transition to a higher state. The other error parameter sensors are indicated by block 242.

Current state identifier logic 234 then identifies a current machine state, based upon the multiple inputs received from the sensors, from operator 218, or other inputs. Identifying the current machine state is indicated by block 344 in the flow diagram of FIG. 3. Current state identifier logic 234 determines which of the predefined operational states 242 machine 100 is in, based upon the multiple inputs. It then determines whether the current state is a problem state (or a lower) as indicated by block 346. If not, then no state transition is attempted and transition condition detection logic 236 monitors the various inputs to determine whether those inputs meet a transition condition, indicating that machine 100 is exiting its current state and entering another state. This is indicated by block 348. If no transition conditions are detected, then processing simply continues in a steady state manner until transition condition detection logic 236 determines that machine 100 is exiting its current state and entering another state, based upon the multiple inputs received.

If transition conditions are met, then processing reverts block 344 where new state identifier logic 238 determines what new state the machine is entering. In one example, new state identifier logic 238 can be the same as current state identifier logic 234, and the transition conditions detected by logic 236 are applied to current state identifier logic 234 to determine what the new, but current, state of machine 100 is, based on those inputs.

If, at block 346, logic 234 determines that the current state of machine 100 is a problem state (or a lower state), then this means that control signals are to be generated in order to attempt to address the problem state (or a lower state), and transition machine 100 to a non-problem state (or higher state) so that it can continue operating in steady state. In that case, current state identifier logic 234 identifies the particular problem state or lower state (from the predefined states 242 and possibly a state hierarchy 243) that machine 100 has entered. This is indicated by block 250 in the flow diagram of FIG. 3.

When the problem state (or lower state) is identified, it is provided to control signal generator logic 228 which identifies a solution that may be used to address the identified problem state or to transition machine 100 to a higher state. This is indicated by block 352. In one example, logic 228 uses arbitrator logic 250 to determine which of the active automation systems 258 is highest in the precedence hierarchy, so that it can first be controlled in order to attempt to address the problem state or transition to a higher state. Control signal generator logic 228 can access the problem (lower) state/action data store 230 which includes solutions 254 corresponding to various different problem states or lower states. The solutions may be arranged in hierarchical order as to which is most likely to address the problem state or accomplish a transition to a higher state, under different conditions. Arbitrator logic 250 may assist in identifying the solution to a particular problem state or lower state using the precedence hierarchy of the automation systems 258 that was input by the operator 218 or selected by machine 100. Thus, it may rearrange the hierarchical solutions based upon the precedence hierarchy for which automation systems 258 are to be manipulated first, in order to address the problem state or achieve a state transition. Using arbitrator logic 250 in identifying a solution is indicated by block 354. The solution can be identified in a wide variety of other ways as well, and this is indicated by block 256.

Once control signal generator logic 228 has identified a solution to address the problem state or transition to a higher state, it illustratively generates a plurality of control signals in order to obtain machine settings that will implement the solution. For example, the solution may be to modify the fan speed, chaffer openings, and the ground speed of machine 100. In that case, a plurality of different control signals are generated in order to implement the overall solution. This is just one example, and generating a plurality of control signals to obtain machine settings that implement the identified solution is indicated by block 258 in the flow diagram of FIG. 3.

In one example, control system 200 then waits for the machine settings to be obtained. For instance, some machine settings may not be able to change instantaneously, but instead require an adjustment time. Thus, waiting until the machine settings have been obtained is indicated by blocks 360 and 362 in the flow diagram of FIG. 3. Once the control signals have implemented the solution, then finite state machine logic 224 again determines what state machine 100 is in, and whether the problem has been resolved or the state transition has taken place. This is indicated by block 364 in the flow diagram of FIG. 3. If so, then processing illustratively returns to block 344 where the current state of the machine is identified, and is monitored to determine whether entry/exit conditions occur indicating that the machine is exiting the current state and entering another state.

However, if, at block 364, the problem has not been resolved or the desired machine state transition has not taken place (in that machine 100 has not transitioned out of the problem state into a non-problem state or from the lower state to a higher state), then finite state machine logic 224 indicates this to control signal generator logic 228. Control signal generator logic 228 illustratively identifies whether any more solutions are to be tried. For instance, it may be that there are only a certain number of solutions that correspond to the identified problem state (or lower state), that can be implemented in order to attempt to address the problem state (or accomplish the state transition). If all of those solutions have been attempted, then there are no more solutions that are geared to addressing the current problem state or lower state. In that case, a message can be generated for operator 218 on one of operator interface mechanisms 216, and processing simply continues in one of a variety of different ways, as indicated by block 370. For example, processing may revert to block 290 and continue as described above. Processing may continue in a problem correction mode in which operator 218 can perform other control operations to attempt to address the problem state (or to transition out of the lower state). Operation can continue by continuing to attempt the series of solutions until one works or until the operation of machine 100 is ended. All of these and other operations are contemplated herein.

In another example, control signal generator logic 228 may be configured to only attempt a certain number of solutions (even through more possible solutions exist), or attempt to address the problems or state transitions for a certain time period. After the predefined number of solutions have been attempted, or the predefined time period has been reached, then, again, a message may be generated for operator 218. Determining whether additional solutions are to be attempted, and generating an operator message, are indicated by blocks 366 and 368 in FIG. 3.

It will also be appreciated that, in some examples, the various states that machine 100 enters, the conditions under which it enters those states, and the times it enters those states (among other information) can be logged either on machine 100, or transmitted to a remote system for storage and further analysis, using a suitable communication system. Further, the attempted solutions, and the efficacy of those solutions (e.g., whether they actually address the problem or accomplish the state transitions) can be recorded as well. All of this, and other information, can be stored locally on machine 100, or transmitted to a separate, remote system.

It can thus be seen that the present description defines finite states for controlling an agricultural harvesting machine, such as a combine. The system control flow is governed by the states identified by the finite state machine. The transitions between states (e.g., entry and exit conditions) are also defined and identified, and logic identifies when the machine is transitioning from one state to another. States can be hierarchically arranged so that machine 100 may attempt to transition from one state to a higher state (e.g., a more efficient state, or an otherwise preferred state that is higher up on a state hierarchy). The state hierarchy being used can be predefined, or it can be input by the operator or selected by machine 100. Also, control system 200 solves for a global optimum where a problem state (or lower state) is identified. This is in contrast to some current systems which monitor a single input and attempt to maintain that input at a given level. This can result in the machine iterating between different control settings in order to attempt to keep two discrete inputs which are separately monitored and controlled for, within predefined ranges. Instead, the present system uses a multiple input-multiple output approach which defines machine states based on multiple inputs, and addresses problem states (or lower states) by identifying a global solution given all the multiple inputs and by generating multiple control outputs. It thus reaches a global optimum instead of attempting to optimize multiple different solutions based on single inputs and single outputs.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
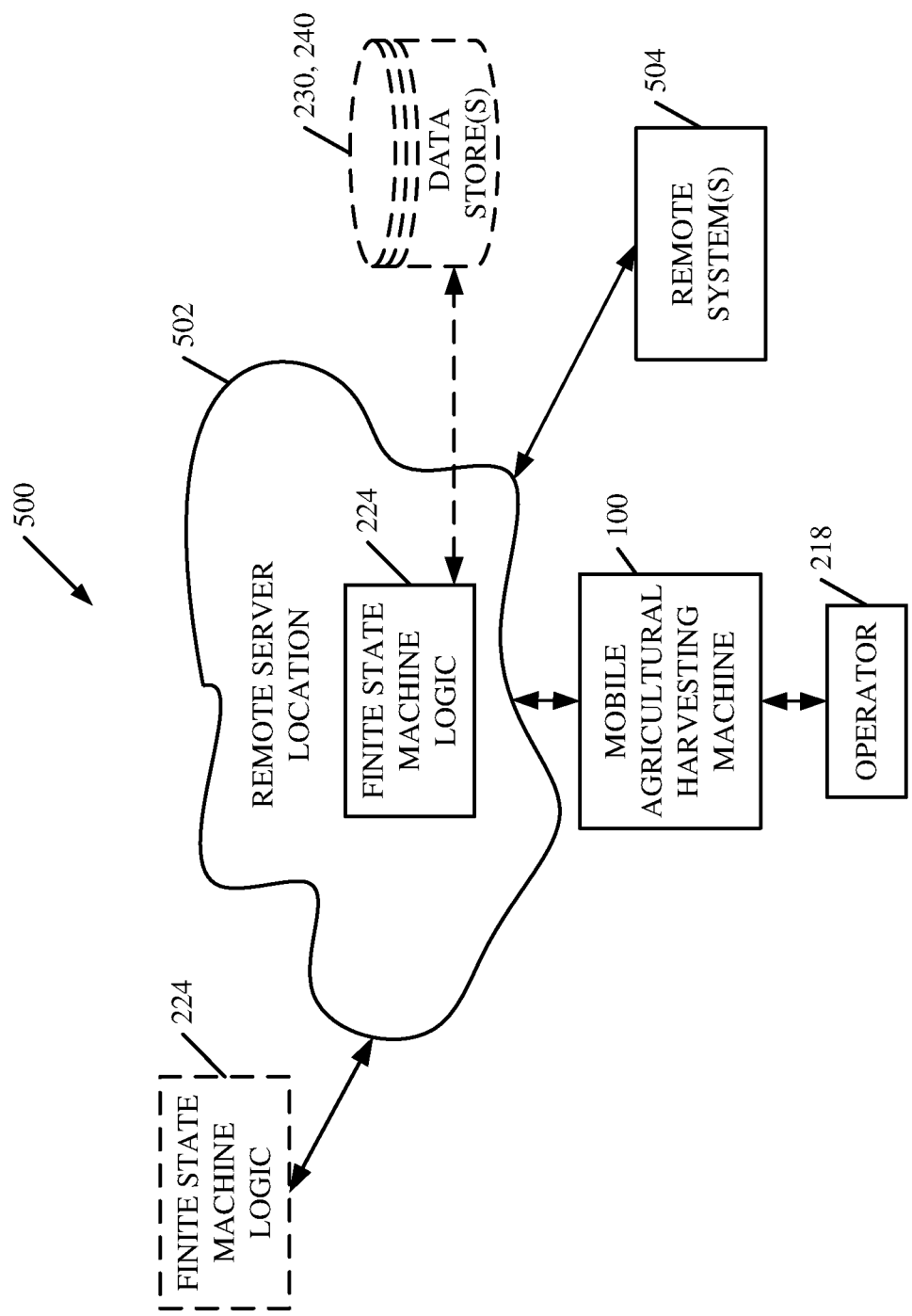
FIG. 4 shows one example of the harvesting machine illustrated in pervious Figures, deployed in a remote server architecture.

FIG. 4 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 4, some items are similar to those shown in FIG. 2 and they are similarly numbered. FIG. 4 specifically shows that finite state machine logic 224 (or parts of it) can be located at a remote server location 502. Therefore, harvester 100 accesses those systems through remote server location 502. FIG. 4 also shows that remote system(s) 504 can be accessed through remote server location 502.

FIG. 4 also depicts another example of a remote server architecture. FIG. 4 shows that it is also contemplated that some elements of FIG. 2 are disposed at remote server location 502 while others are not. By way of example, data stores 230, 240 and/or finite state machine logic 224 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100 comes close to the fuel truck for fueling, the system automatically collects the information from the harvester 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester 100 until the harvester 100 enters a covered location. The harvester 100, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
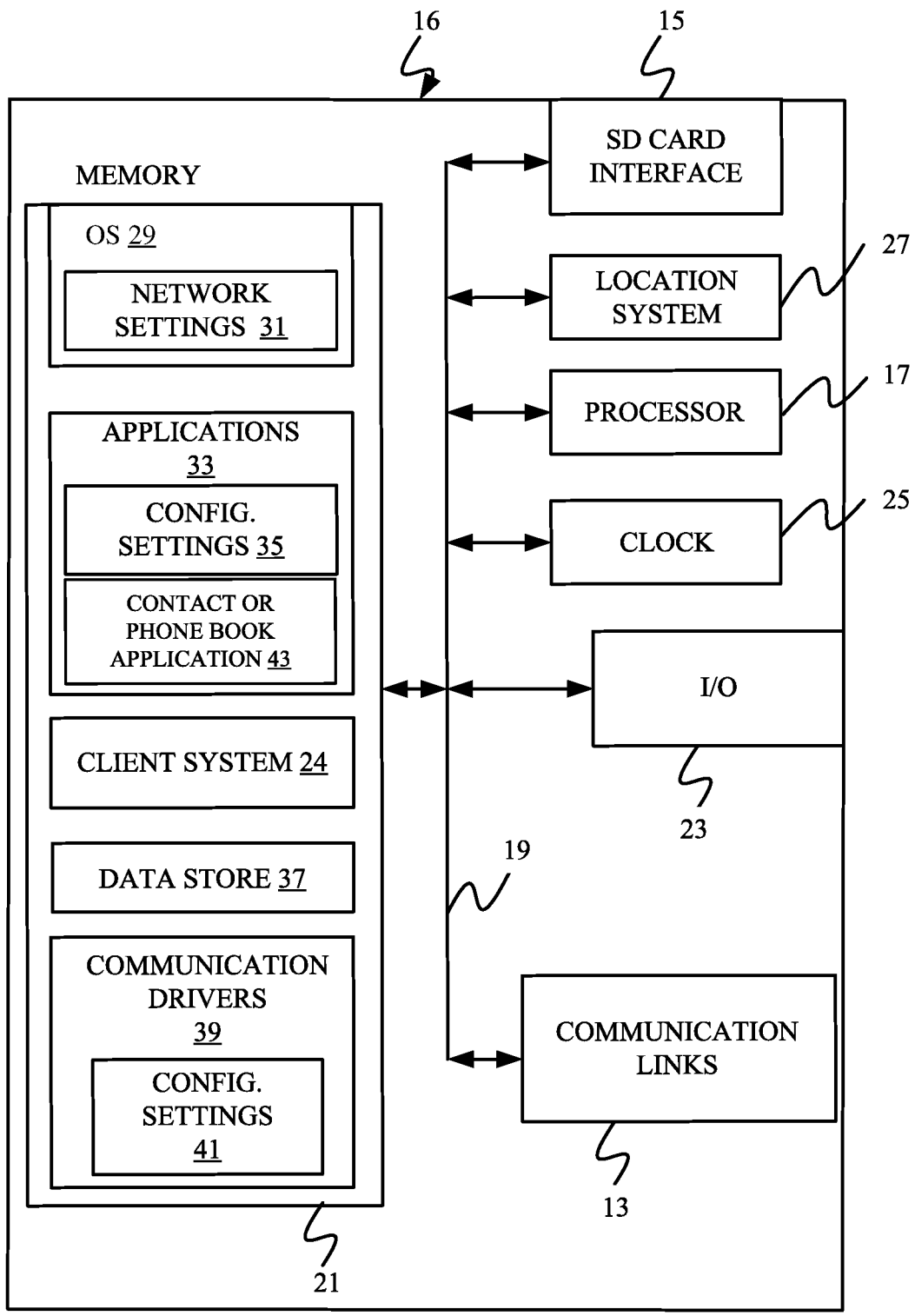
FIGS. 5-7 show examples of mobile devices that can be used with the combine harvester illustrated in the previous Figures.
Figure 6:
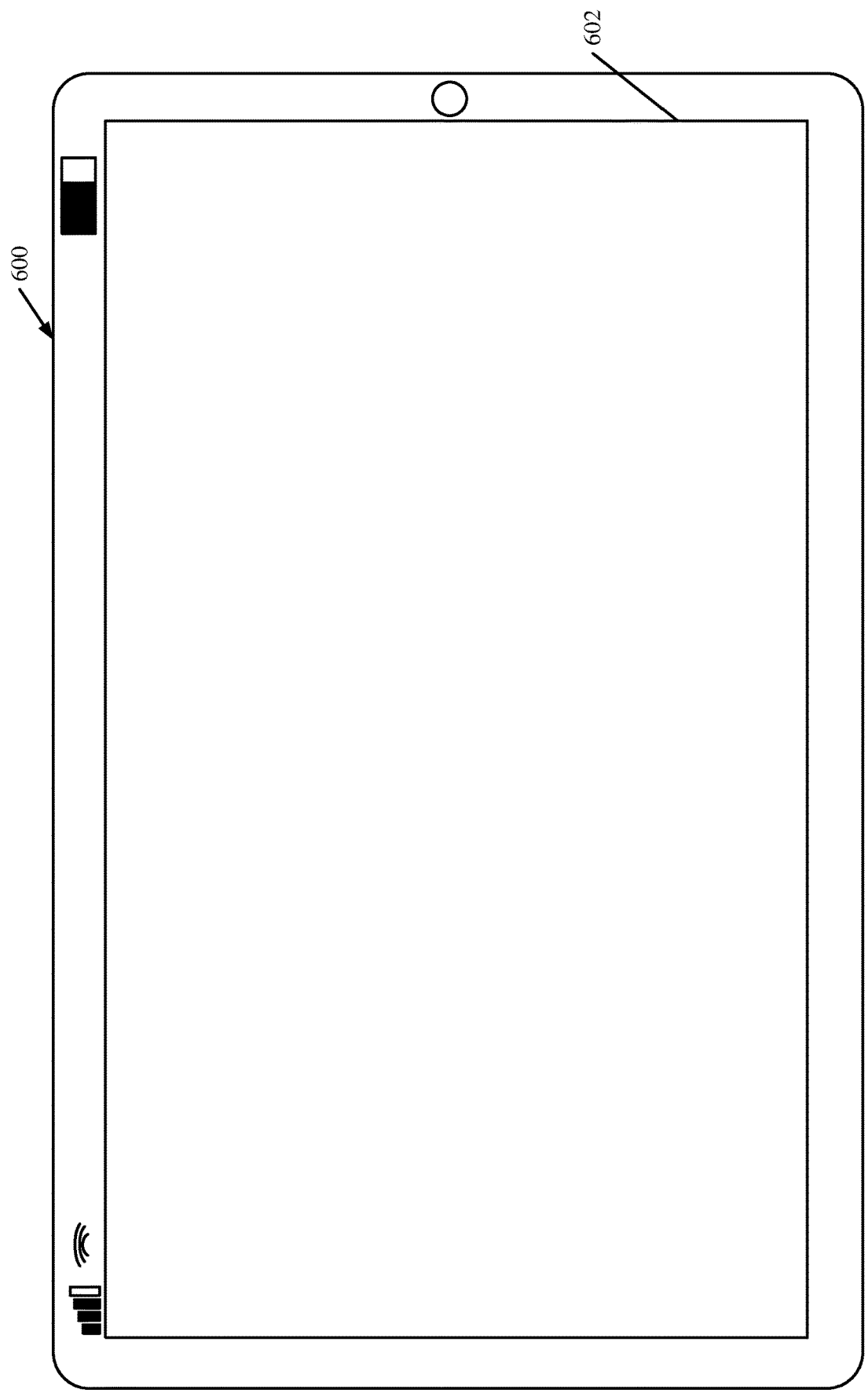
Figure 7:
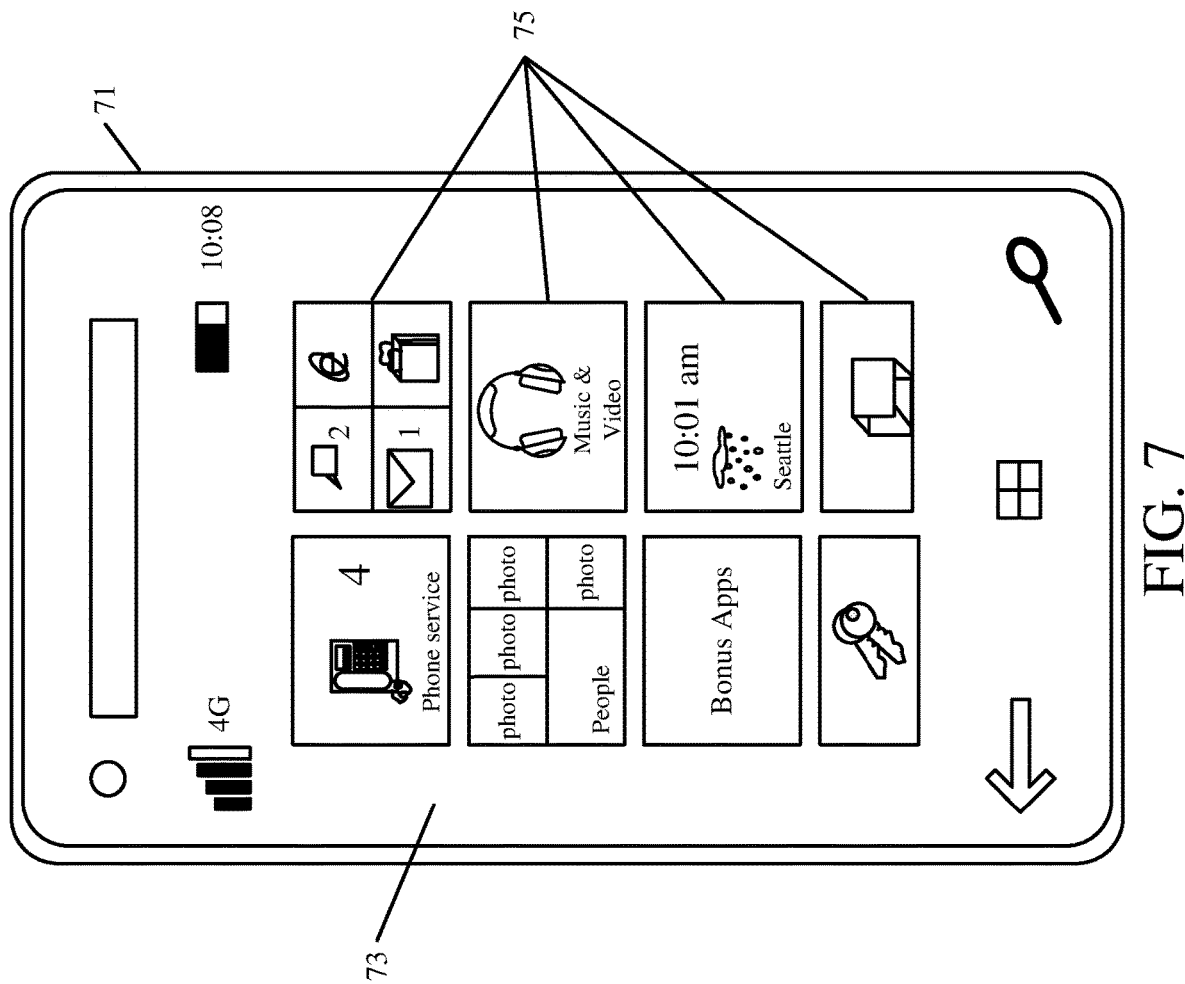

FIG. 5 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the information and user interfaces discussed above. FIGS. 6-7 are examples of handheld or mobile devices.

FIG. 5 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 6 shows one example in which device 16 is a tablet computer 600. In FIG. 6, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
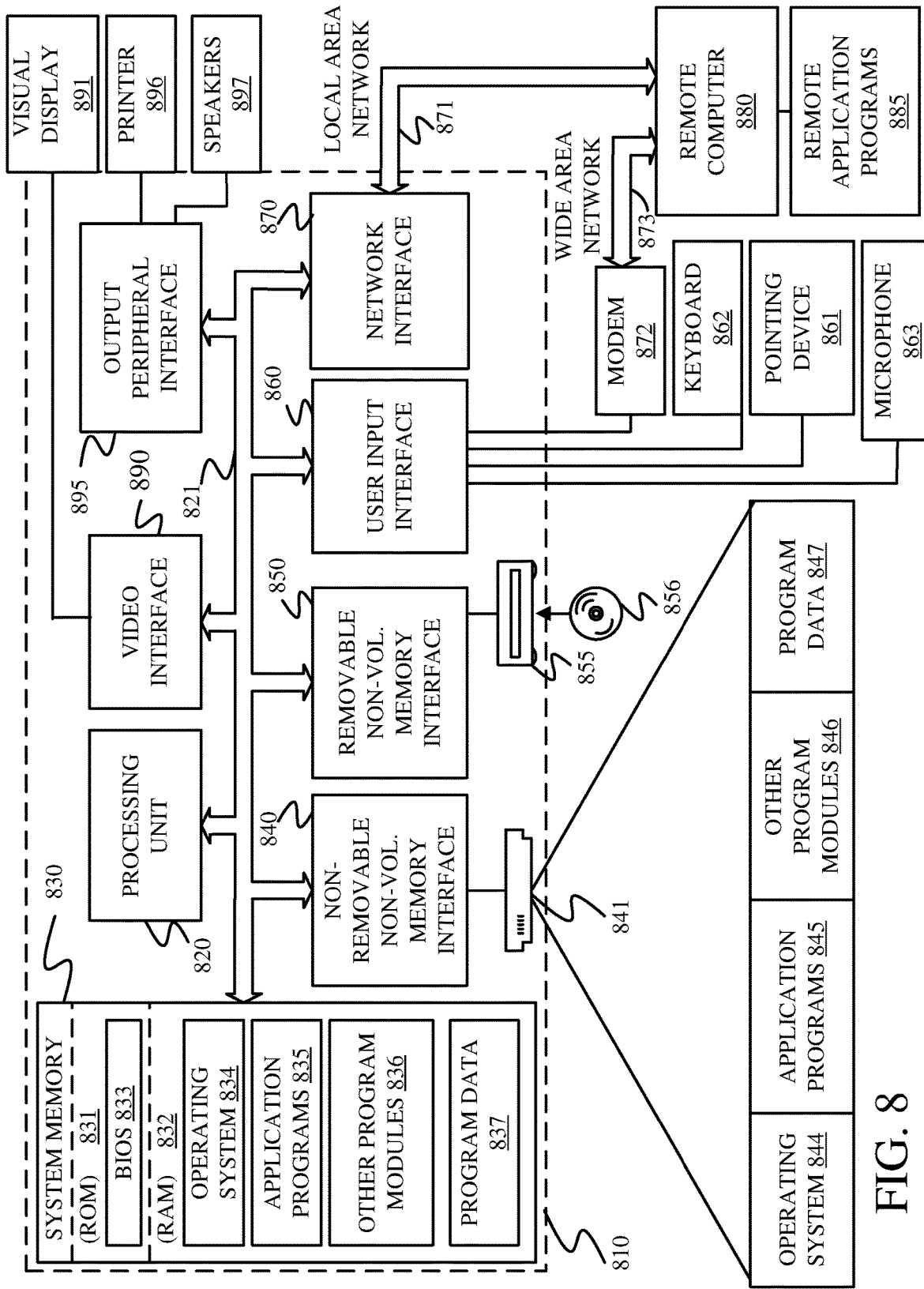
FIG. 8 is a block diagram showing one example of a computing environment that can be used in the architectures shown in the previous Figures.

FIG. 8 is one example of a computing environment in which elements of FIG. 2, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball, levers, knobs, buttons, switches, pedals, steering wheel, or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880. The items can connect over a controller area network (CAN) with a suitable CAN bus.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 8 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural harvesting machine, comprising:
  a plurality of sensors each generating a corresponding sensor signal indicative of a sensed variable;
  a plurality of controllable subsystems; and
  a multiple input-multiple output control system comprising:
    finite state machine logic that identifies an operational state of the agricultural harvesting machine based on the sensed variables indicated by the sensor signals, the operational state being one of a plurality of predefined operational states; and
    control signal generator logic that generates a plurality of control signals to control the plurality of controllable subsystems based on the identified operational state of the agricultural harvesting machine.

Example 2 is the agricultural harvesting machine of any or all previous examples wherein the plurality of predefined operational states comprises:
  a problem state; and
  a non-problem state, the control signal generator logic being configured to, in response to the identified operational state being the problem state, identify a corresponding solution and generate the plurality of control signals to modify control of at least one of the controllable subsystems to implement a solution corresponding to the problem state, based on the identified solution, to attempt to transition the operational state of the agricultural harvesting machine from the problem state to the non-problem state.

Example 3 is the agricultural harvesting machine of any or all previous examples wherein the controllable subsystems comprise:
  a plurality of different selectable automation systems that are selectively activated to implement automated control of a portion of the agricultural harvesting machine.

Example 4 is the agricultural harvesting machine of any or all previous examples wherein the control signal generator logic comprises:
  arbitrator logic configured to receive an automation system precedence hierarchy input indicative of a precedence hierarchy corresponding to the selectively activated automation systems and to generate the plurality of control signals to modify control of the selectively activated automation systems, in order according to the automation system precedence hierarchy.

Example 5 is the agricultural harvesting machine of any or all previous examples wherein the finite state machine logic comprises:
  state identifier logic that identifies the operational state of the agricultural harvesting machine based on the sensed variables indicated by the sensor signals; and
  transition condition detection logic configured to detect that the agricultural harvesting machine is transitioning from the identified operational state to a next operational state, based on the sensed variables indicated by the sensor signals.

Example 6 is the agricultural harvesting machine of any or all previous examples and further comprising:
  a problem state/solution data store that includes a solution corresponding to each predefined problem state, each solution being indicative of a set of machine settings that implement the solution, wherein the control signal generator logic is configured to access the problem state/solution data store to identify the solution corresponding to the identified problem state and generate the plurality of control signals to implement the set of machine settings indicated by the identified solution.

Example 7 is the agricultural harvesting machine of any or all previous examples wherein the problem state/solution data store includes a separate set of hierarchically arranged solutions corresponding to each of a plurality of predefined problem states, wherein the control signal generator logic is configured to access the problem state/solution data store to identify the solution corresponding to the identified problem state, in an order corresponding to the hierarchically arranged solutions.

Example 8 is the agricultural harvesting machine of any or all previous examples wherein the plurality of predefined operational states are hierarchically arranged according to a state hierarchy and wherein the control signal generator logic generates the plurality of control signals to control the plurality of controllable subsystems based on the identified operational state of the agricultural harvesting machine and based on where the identified operational state is in the state hierarchy.

Example 9 is the agricultural harvesting machine of any or all previous examples wherein the plurality of sensors comprises:
  a field sensor generating a field characteristic sensor signal indicative of a characteristic of a field over which the agricultural harvesting machine is traveling;
  a machine sensor generating a machine parameter sensor signal indicative of a parameter corresponding to the agricultural harvesting machine; and
  an error parameter sensor generating an error parameter signal indicative of a parameter that indicates an operational problem.

Example 10 is a method of controlling an agricultural harvesting machine, comprising:
  detecting a plurality of sensor signals, each being indicative of a different sensed variable;
  identifying an operational state of the agricultural harvesting machine, using a finite state machine, based on the sensed variables indicated by the sensor signals, the operational state being one of a plurality of predefined operational states in the finite state machine; and automatically generating a plurality of control signals to control a plurality of controllable subsystems based on the identified operational state of the agricultural harvesting machine.

Example 11 is the method of any or all previous examples wherein the plurality of predefined operational states comprises a problem state and a non-problem state, wherein automatically generating the plurality of control signals comprises:

in response to the identified operational state being the problem state, identifying a corresponding solution; and generating the plurality of control signals to modify control of at least one of the controllable subsystems to implement a solution corresponding to the problem state, based on the identified solution, to attempt to transition the operational state of the agricultural harvesting machine from the problem state to the non-problem state.

Example 12 is the method of any or all previous examples and further comprising:

selectively activating a plurality of different selectable automation systems that are selectively activated to implement automated control of a portion of the agricultural harvesting machine.

Example 13 is the method of any or all previous examples wherein automatically generating a plurality of control signals comprises:

receiving an automation system precedence hierarchy input indicative of a precedence hierarchy corresponding to the selectively activated automation systems; and generating the plurality of control signals to modify control of the selectively activated automation systems, in order according to the automation system precedence hierarchy.

Example 14 is the method of any or all previous examples wherein identifying an operational state comprises:

identifying the operational state of the agricultural harvesting machine based on the sensed variables indicated by the sensor signals; and detecting that the agricultural harvesting machine is transitioning from the identified operational state to a next operational state, based on the sensed variables indicated by the sensor signals.

Example 15 is the method of any or all previous examples wherein automatically generating a plurality of control signals comprises:

accessing a problem state/solution data store that includes a solution corresponding to each predefined problem state, each solution being indicative of a set of machine settings that implement the solution;

identifying the solution corresponding to the identified problem state; and generating the plurality of control signals to implement the set of machine settings indicated by the identified solution.

Example 16 is the method of any or all previous examples wherein the problem state/solution data store includes a separate set of hierarchically arranged solutions corresponding to each of a plurality of predefined problem states, wherein identifying the solution comprises:

identifying the solution corresponding to the identified problem state, in an order corresponding to the hierarchically arranged solutions.

Example 17 is the method of any or all previous examples wherein the plurality of predefined operational states are hierarchically arranged according to a state hierarchy and wherein automatically generating the plurality of control signals comprises:

automatically generating the plurality of control signals to control the plurality of controllable subsystems based on the identified operational state of the agricultural harvesting machine and based on where the identified operational state is in the state hierarchy.

Example 18 is the method of any or all previous examples wherein detecting the plurality of sensor signals comprises:

detecting a field characteristic sensor signal indicative of a characteristic of a field over which the agricultural harvesting machine is traveling;

detecting a machine parameter sensor signal indicative of a parameter corresponding to the agricultural harvesting machine; and detecting an error parameter signal indicative of a parameter that indicates an operational problem.

Example 19 is a control system for controlling an agricultural harvesting machine, the control system comprising:

finite state machine logic that receives a plurality of sensor signals, each being indicative of a different sensed variable, and that identifies an operational state of the agricultural harvesting machine based on the sensed variables indicated by the sensor signals, the operational state being one of a plurality of predefined operational states; and control signal generator logic that generates a plurality of control signals to control a plurality of controllable subsystems on the agricultural harvesting machine based on the identified operational state of the agricultural harvesting machine.

Example 20 is the control system of any or all previous examples wherein the plurality of predefined operational states comprises:

a problem state; and a non-problem state, the control signal generator logic being configured to, in response to the identified operational state being the problem state, identify a corresponding solution and generate the plurality of control signals to modify control of at least one of the controllable subsystems to implement a solution corresponding to the problem state, based on the identified solution, to attempt to transition the operational state of the agricultural harvesting machine from the problem state to the non-problem state.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine, comprising:

a plurality of sensors each generating a corresponding sensor signal indicative of a sensed variable;

a plurality of controllable subsystems; and a multiple input-multiple output control system comprising:

finite state machine logic configured to identify an operational state of the agricultural harvesting machine based on the sensed variables indicated by the sensor signals, the operational state being one of a plurality of predefined operational states on a hierarchy of predefined operational states including a lower predefined operational state, a higher predefined operational state and a plurality of intermediate predefined operational states hierarchically arranged on the hierarchy of predefined operational states between the lower predefined operational state and the higher predefined operational state; and control signal generator logic configured to identify a solution corresponding to the identified operational state, the solution being one of a plurality of hierarchically arranged solutions corresponding to the identified operational state and being indicative of a plurality of control signals that modify control of at least one of the plurality of controllable subsystems to transition the operational state of the agricultural harvesting machine from the identified operational state to a different predefined operational state higher in the hierarchy of predefined operational states than the identified operational state, the control signal generator logic generating the plurality of control signals.

2. The agricultural harvesting machine of claim 1 wherein the controllable subsystems comprise:
a plurality of different selectable automation systems that are selectively activated to implement automated control of a portion of the agricultural harvesting machine.

3. The agricultural harvesting machine of claim 2 wherein the control signal generator logic comprises:
arbitrator logic configured to receive an automation system precedence hierarchy input indicative of a precedence hierarchy corresponding to the selectively activated automation systems and to generate the plurality of control signals to modify control of the selectively activated automation systems, in order according to the automation system precedence hierarchy.

4. The agricultural harvesting machine of claim 1 wherein the finite state machine logic comprises:
state identifier logic that identifies the operational state of the agricultural harvesting machine based on the sensed variables indicated by the sensor signals; and
transition condition detection logic configured to detect that the agricultural harvesting machine is transitioning from the identified operational state to the different predefined operational state, based on the sensed variables indicated by the sensor signals.

5. The agricultural harvesting machine of claim 4 and further comprising:
a problem state/solution data store that includes the hierarchically arranged solutions corresponding to each predefined operational state, each solution being indicative of a set of machine settings that implement the solution, wherein the control signal generator logic is configured to generate the plurality of control signals to implement the set of machine settings indicated by the identified solution.

6. The agricultural harvesting machine of claim 1 wherein the plurality of sensors comprises:
a field sensor generating a field characteristic sensor signal indicative of a characteristic of a field over which the agricultural harvesting machine is traveling;
a machine sensor generating a machine parameter sensor signal indicative of a parameter corresponding to the agricultural harvesting machine; and
an error parameter sensor generating an error parameter signal indicative of a parameter that indicates an operational problem.

7. A method of controlling an agricultural harvesting machine, comprising:
detecting a plurality of sensor signals, each being indicative of a different sensed variable;
receiving an automation system precedence hierarchy input indicative of a precedence hierarchy corresponding to a plurality of selectively activated automation systems that are selectively activated to implement automated control of a portion of the agricultural harvesting machine;
identifying an operational state of the agricultural harvesting machine, using a finite state machine, based on the sensed variables indicated by the sensor signals, the operational state being one of a plurality of predefined operational states in the finite state machine;
accessing the automation system precedence hierarchy, based on the identified operational state, to identify a first of the plurality of automation systems in the automation system precedence hierarchy;
automatically generating a control signal to selectively activate the identified automation system; and
if the operational state of the agricultural harvesting machine does not switch to a different operational state, then accessing the automation system precedence hierarchy to identify a second one of the automation systems and automatically generating a control signal to selectively activate the second automation system.

8. The method of claim 7 wherein automatically generating a control signal comprises:
and
generating the control signals to modify control of the selectively activated automation systems, in order according to the automation system precedence hierarchy.

9. The method of claim 7 wherein identifying an operational state comprises:
identifying the operational state of the agricultural harvesting machine based on the sensed variables indicated by the sensor signals; and
detecting that the agricultural harvesting machine is transitioning from the identified operational state to a different operational state, based on the sensed variables indicated by the sensor signals.

10. The method of claim 7 wherein automatically generating a control signals comprises:
accessing an operational state/solution data store that includes a solution corresponding to each predefined operational state, each solution being indicative of a set of machine settings that implement the solution;
identifying the solution corresponding to the identified operational state; and
generating the plurality of control signals to implement the set of machine settings indicated by the identified solution.

11. The method of claim 10 wherein the operational state/solution data store includes a separate set of hierarchically arranged solutions corresponding to each of a plurality of predefined operational states, wherein identifying the solution comprises:
identifying the solution corresponding to the identified operational state, in an order corresponding to the hierarchically arranged solutions.

12. The method of claim 7 wherein detecting the plurality of sensor signals comprises:
detecting a field characteristic sensor signal indicative of a characteristic of a field over which the agricultural harvesting machine is traveling;

detecting a machine parameter sensor signal indicative of a parameter corresponding to the agricultural harvesting machine; and detecting an error parameter signal indicative of a parameter that indicates an operational problem.

13. A control system for controlling an agricultural harvesting machine, the control system comprising:

finite state machine logic configured to identify an operational state of the agricultural harvesting machine based on the sensed variables indicated by the sensor signals, the operational state being one of a plurality of predefined operational states on a hierarchy of operational states including a lower predefined operational state, a higher predefined operational state and a plurality of intermediate predefined operational states hierarchically arranged on the hierarchy of operational states between the lower predefined operational state and the higher predefined operational state; and control signal generator logic configured to identify a solution corresponding to the identified operational state, the solution being one of a plurality of hierarchically arranged solutions corresponding to the identified operational state and being indicative of a plurality of control signals that modify control of at least one of the plurality of controllable subsystems to transition the operational state of the agricultural harvesting machine from the identified operational state to a different predefined operational state higher in the hierarchy of operational states than the identified operational state, the control signal generator logic generating the plurality of control signals.

* * * * *